Dec. 6, 1960

J. F. YERGER 2,963,691

HOT BEARING DETECTOR

Filed Jan. 30, 1957

INVENTOR.
J.F. YERGER
BY
Forest B. Hitchcock
HIS ATTORNEY

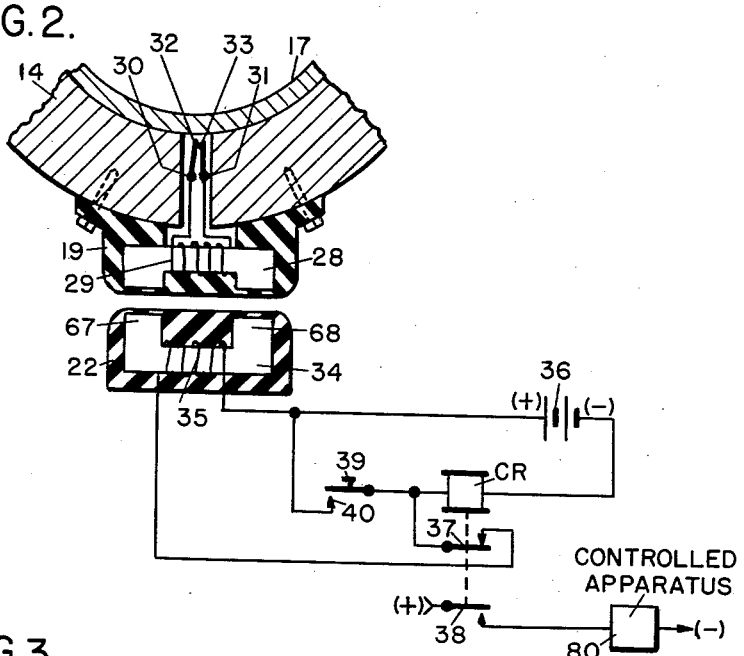
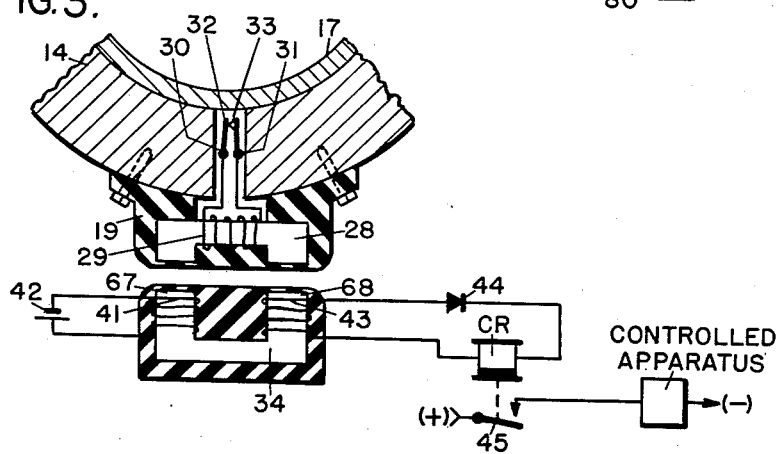
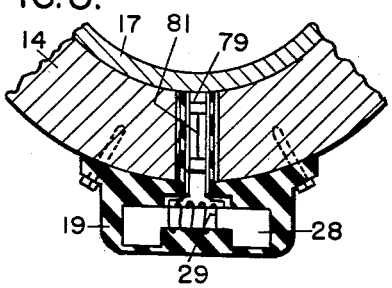

Dec. 6, 1960   J. F. YERGER   2,963,691
HOT BEARING DETECTOR

Filed Jan. 30, 1957   3 Sheets-Sheet 3

INVENTOR.
BY J. F. YERGER
*Forest B. Hitchcock*
HIS ATTORNEY

United States Patent Office
2,963,691
Patented Dec. 6, 1960

2,963,691

HOT BEARING DETECTOR

John Francis Yerger, 1976 Morrison Ave., Union, N.J.

Filed Jan. 30, 1957, Ser. No. 637,127

10 Claims. (Cl. 340—231)

This invention relates to a system for detecting an overheated condition of rotating bearings of machinery and particularly the connecting rod bearings of reciprocating internal combustion engines.

This invention is useful in that it protects the brasses of the bearings against the risk of damage from excessive heat, and facilitates the supervision of the machine or engine during the course of its operation. Due to the particular rotary motion and the inaccessibility of the connecting rod bearing structure of an internal combustion engine, a reliable system is needed for directly detecting and indicating an overheated condition of the connecting rod bearings, so that the cause of this overheated condition can be corrected before the effect of such abnormal heating, such as undue wear or bearing failure, places the engine out of commission and in a state of disrepair.

It is proposed according to this invention to provide a hot bearing detecting apparatus in which the overheated condition of a connecting rod bearing is reliably transmitted or transferred to an appropriate receiving apparatus, which receiving apparatus includes a suitable alarm or control system.

Described briefly, the excessive temperature detecting apparatus of this invention comprises both an inductive device attached to and movable with the connecting rod bearing, and a receiving apparatus fastened to a relatively fixed portion of the engine and positioned in close proximity and adjacent to the rotary path of the connecting rod bearing so as to be periodically in an inductive coupling relationship during the operation of the engine. The inductor which is attached to the connecting rod bearing includes a control winding which is either short circuited or open circuited by a thermal responsive device depending upon the temperature of the particular connecting rod bearing associated therewith.

The receiving apparatus includes a magnetized core and a winding thereon which gives an output upon the passage of the movable inductor of a value dependent upon whether the control winding of the inductor is open circuited or closed circuited. Suitable electroresponsive means is controlled by the distinctive output of said receiver winding, which electroresponsive means can in turn control an alarm indication to be given when it is controlled to a condition corresponding to an excessive bearing temperature.

In view of the above considerations, one object of the present invention is to provide a reliable system for detecting an overheated condition of elements of a machine which elements repeatedly move in a predetermined path in accordance with the particular operation of the machine.

Another object of this invention is to provide an improved hot bearing detecting apparatus which is without any physical or mechanical connection between the inductor attached to the connecting rod bearings and the stationary receiver fastened to a relatively fixed part of the engine.

A further object of this invention is to provide a reliable heat detecting system which in accordance with the principles of induction utilizes the mechanical motion of the connecting rod bearing to transmit a normal or an abnormal temperature condition of the connecting rod bearing to a receiver which is attached to a stationary portion of the engine in close proximity and adjacent to the path of the bearing carried inductor.

A further object of this invention is to provide an inductive hot bearing detection device comprising an inductor mounted on the rotating bearing which inductor has no external source of current connected therewith.

Other objects, purposes and characteristic features of this invention will in part be obvious in the accompanying drawings and in part pointed out as the description progresses.

In describing this invention in detail, reference is made to the accompanying drawings in which like reference characters designate corresponding parts throughout the various views and in which:

Fig. 2 is a diagrammatical view of one form of apparatus embodying the invention and illustrating particularly the circuits involved in the receiver and the inductor of this invention;

Fig. 3 is a diagrammatical view illustrating an alternative arrangement of the circuit system of Fig. 2;

Fig. 5 illustrates a portion of the connecting rod bearing structure provided with a fusible element for controlling the inductor winding;

The invention as here shown is applied to a two-cycle internal combustion engine of the diesel type although it may be applied to any suitable type of machine or engine.

Figure 1:
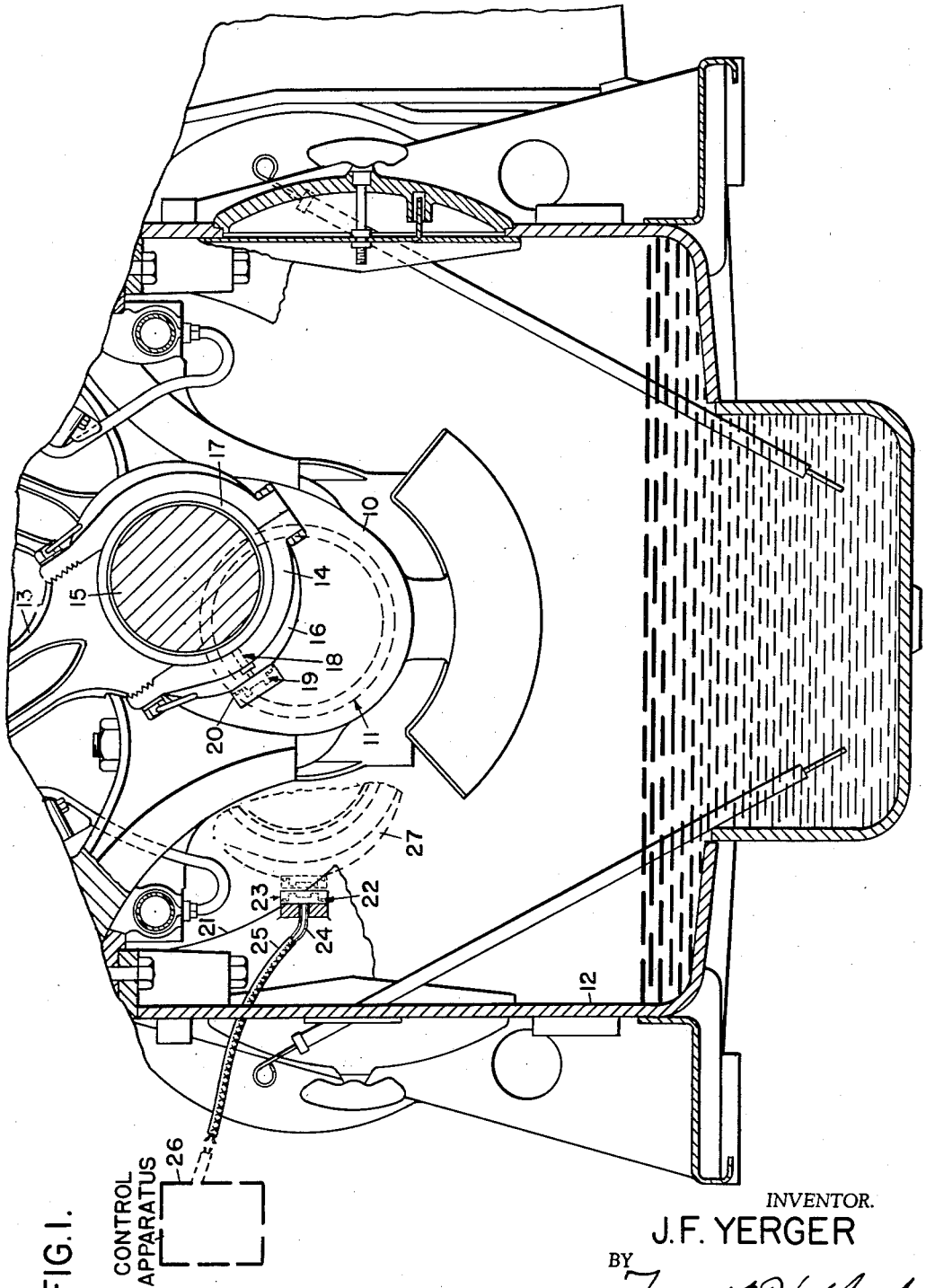
Fig. 1 is a rear view of an internal combustion engine illustrating a connecting rod bearing provided with this invention.

Referring to Fig. 1, the engine here shown comprises a crank shaft 10 rotating in a main bearing 11 in the crank case 12. Connecting rod 13 is connected to the crank shaft 10 through the connecting rod bearing assembly 14. The portion of the crank shaft 15 rotates in the bearing assembly 14 and around the axis 16 of the crank shaft 10. During the operation of the engine, the bearing brass or liner 17 is subjected to friction and resultant heat. Fastened to the bearing assembly 14 is an inductive apparatus 19 comprising a thermal responsive element 18 adjacent to the bearing surface 17. The inductive apparatus 19 is suitably encased in a hermetically sealed enclosure 20 which is constructed of any well-known nonmagnetic material. Suitably attached to a portion 21 of the engine crank case 12 is an inductive receiving apparatus 22. This receiving apparatus 22 is hermetically sealed in a suitable enclosure 23 of nonmagnetic material. The receiving apparatus 22 is electrically connected by conductors 24 through a conduit 25 to a conventional alarm or visual control device 26. The receiving apparatus 22 is so disposed that during the operation of the engine the bearing carried inductive apparatus 19 approaches and passes through a path in close proximity to the front of the receiving apparatus 22 and in inductive coupling relationship therewith. A certain portion of this path is approximately shown by the dotted lines 27.

Fig. 2 shows one form of apparatus embodying the invention. The inductive apparatus 19 comprises an inductor 28 which is made of a suitable laminated magnetic material. Surrounding the center portion of the inductor core 28 is a control winding 20. Fastened to the terminals 30 and 31 of the control winding 29 are two thermal contact elements 32 and 33. The thermal contact elements 32 and 33 in Fig. 2 are so constructed that they are closed when the bearing surface 17 has a normal running temperature, and are normally open when the bearing surface 17 is in an over-heated or critical temperature condition. Therefore, it is apparent that when the bearing temperature is normal, the control winding 29 is in a circuit of low resistance or in other words, short-circuited, and when the bearing temperature is excessive the control winding 29 is in a circuit of high resistance or in other words, open-circuited.

The receiving apparatus 22 comprising a laminated core 34 of a suitable magnetic material, is of similar size and configuration to the inductive core 28. Surrounding the center portion of the receiving core 34 is a magnetizing winding 35. One terminal of the winding 35 is connected to the positive side of a suitable direct current source 36. The other terminal of the winding is connected to the front contact 37 of an alarm or indication control relay CR. Therefore, it is apparent that when the relay CR is energized a circuit is completed extending from a positive side of the direct current source 36, including the receiver winding 35, the front contact 37 of relay CR, and the winding of relay CR to the negative side of the direct current source 36. The value of the current normally flowing in the receiver circuit heretofore described is just above the drop-away value of the relay CR.

A push button 39 is used to complete a circuit for initially energizing the relay CR which circuit extends from (+) and includes back contact 40 of push button 39 and the winding of relay CR to the negative side of the direct current source 36. This pick-up circuit shunts out the resistance of the receiver winding 35 so that the normal value of the current which is just above the drop-away value of the relay CR as heretofore mentioned is increased so that the relay CR may be initially picked up. The current from the direct current source 36 energizes the relay CR in series with the control winding 35. Therefore, when the relay CR is normally in an energized condition, the receiver core 34 is magnetized by the current flowing through the control winding 35.

An energizing circuit for a suitable visual or audible alarm system, or any other conventional control circuit, is provided when the relay CR is dropped away. This circuit extends from (+), and includes the back contact 38 of relay CR, the alarm controlled apparatus 80, to (−).

In operation, when the receiver and the inductor are not in an inductively coupled relationship, the magnetic flux in the receiver core 34 is limited by the relatively smaller air gap between the pole pieces 67 and 68 of the receiver core 34. Therefore, when the connecting rod bearing carried inductor is moving in that part of its path away from the influence of the receiver core 34, the magnetic and electrical conditions in the receiving apparatus and circuit are stable and the relay CR is held energized by its previously described energizing circuit. During the interval in which the inductor passes across the receiver and when the temperature of the connecting rod bearing is excessive and the inductive control winding 29 is open-circuited, the conditions effecting the magnetic flux in the receiver change rapidly. At this time the inductor provides a good magnetic path between the pole pieces of the receiver at relatively smaller air gaps at each pole. As a result a surge of magnetic flux builds up in the receiver inducing a voltage in the receiver winding 35 which is in opposition to the voltage of the direct current source 36. This opposition surge in effect causes a decrease in the current of the energizing circuit for the relay CR which causes it to drop away, since the relay CR is of the quick release type.

When the relay CR drops away the aforementioned back contact 38 of relay CR is closed which actuates the aforementioned alarm system indicating that the bearing surface 17 is too hot.

When the temperature of the connecting rod bearing is normal, the thermal contacts 32 and 33 are closed and during the interval when the inductor and receiver core are in an inductively coupled relationship, flux starts to build up in the receiver-inductor magnetic circuit. However, the voltage induced in the control winding 29 causes current to flow in the control winding 29 and the magnetic flux produced by this current opposes the magnetic flux which causes the current in the control winding 29 to flow. As a result, the net change of flux is much less than when the control winding is open-circuited and the resultant opposition surge in the receiver coil 35 is much smaller and does not increase the current in the relay energizing circuit to a point where the relay CR drops away. Therefore, under normal conditions the relay CR is maintained energized and the inductor core 28 has no operating effect on the current values in the relay circuit during the repeated passage of the inductor past the associated receiver.

Figure 6:
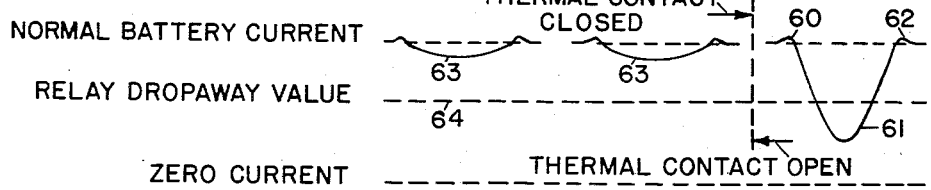
Fig. 6 illustrates the different current variations produced in the receiver by the circuit arrangement as shown in Fig. 2.

Fig. 6 graphically illustrates in a generally typical way the current variations in relay CR of Fig. 2 during repeated intervals of the inductively coupled relationship. The solid curved line 61 of Fig. 6 represents the effect of the inductor with its control winding open-circuited on the current values of the energizing circuit. Starting with the normal current at point 60 on the curve, the opposition voltage causes the current in relay CR to drop to a minimum value on the curve. Then as the inductor moves away from the receiver the current rises again to its normal value as designated at point 62. In actual practice, this complete curve 61 would not occur because relay CR would drop shortly after the current became less than the drop-away current value as shown by the horizontal dotted line 64 in Fig. 6.

The current variation in the relay CR when the control winding 29 is closed at thermal contacts 32 and 33 is represented by the curved lines 63 of Fig. 6. It is apparent under these conditions that the current does not decrease below the drop-away value at any point so that the relay CR remains picked up when the inductor core 28 passes the receiver core 34 in an inductively coupled relationship.

Fig. 3 shows an alternative form of apparatus embodying this invention wherein the thermal contacts 32 and 33 connected to the terminals of the control winding 29 on the inductor core 28 are closed when the temperature of the bearing surface 17 is normal. In this form of the invention, the pole pieces 67 of the receiver core 34 has a primary coil 41 connected to a direct current source 42. This produces a normal magnetic flux in the receiver core. A secondary coil 43 surrounds the other pole piece 68 of the core 34. The relay CR is connected in a closed circuit which extends from the upper terminal of the secondary winding 43 and includes the half wave rectifier 44, the winding of relay CR, and to the lower terminal of the winding 43. The relay CR is normally dropped away when the temperature of the connecting rod bearing surface 17 is normal, because the movement of the inductor core 28 across the receiver core 34 has little effect on the magnetic circuit of the receiver core 34. However, when the bearing is overheated the control winding 29 is open-circuited and the motion of the inductor 28 induces a wave of alternating current in the secondary coil 43 each time the inductor 28 passes the receiver 34 in an inductive coupling relationship. This induced alternating current is rectified by the half wave rectifier 44. The repeated movements of the inductor 28 across the receiver 34 thereby causes a pulsating direct current to energize the relay CR and cause it to pick up. This relay is made slow acting so that under overheated bearing conditions the relay CR will not drop away during the interval between successive pulses of direct current. When the relay CR is picked up indicating an overheated bearing condition, a suitable alarm or controlled circuit apparatus is actuated through the front contact 45 of the relay CR.

Figure 7:
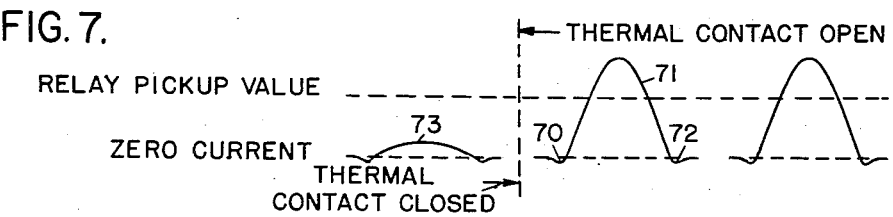
Fig. 7 illustrates the different current variations produced in the receiver by the circuit arrangement as shown in Fig. 3.

Fig. 7 illustrates in a generally typical way the variations in current in the relay CR caused by the inductive effect of the inductor on the receiver structure as shown in the arrangement in Fig. 3. When the inductor is away from the receiver there is no current flowing in the secondary coil 43 and the current value is represented as being at the zero current level. As the inductor 28 with its control winding 29 open-circuited, passes the receiver 34, the current value increases from point 70 to a maximum value and then decreases to zero at point 72 to form the curve 71. The curve 71 has a considerable area above the pick up value level, which received repeatedly through rectifier 44 causes the pick-up of the relay CR. The curved line designated as 73 illustrates the effect of the inductor 28 on the receiver current with the control winding 29 closed by contacts 32 and 33. Since such current variations do not rise above the pick-up value level, relay CR remains dropped away under such circumstances.

Figure 4:
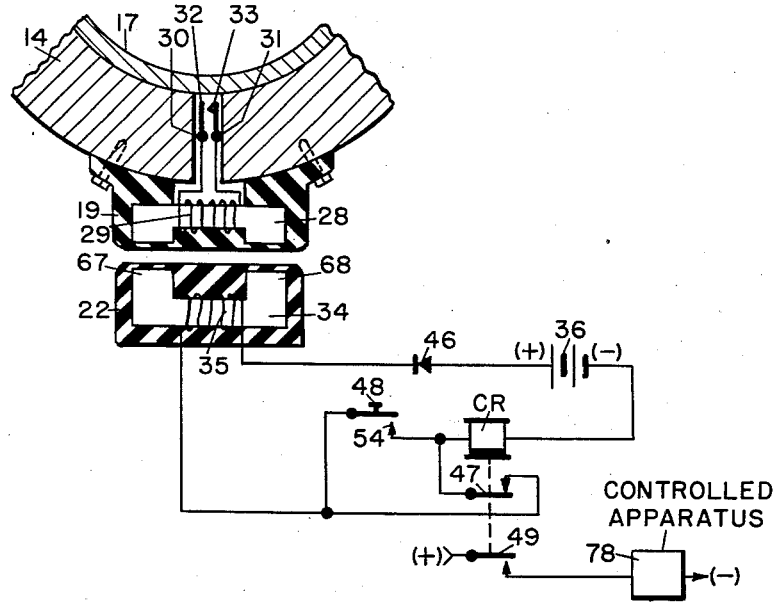
Fig. 4 is a diagrammatical view illustrating another arrangement of the circuit system of Fig. 2.

Fig. 4 shows another form of apparatus embodying the invention wherein the thermal contacts 32 and 33 are open when the connecting rod bearing temperature is normal. Referring to Fig. 4 the receiver core structure 34 includes winding 35 around the center portion thereof. The energizing circuit for the relay CR extends from the positive side of the direct current source 36, and includes the half wave rectifier 46, the receiver winding 35, the front contact 47 of the relay CR, and the winding of relay CR to the negative side of the direct current source 36. A push button 48 is provided to initially energize the relay CR by a circuit which extends from the positive side of the direct current source 36, the half wave rectifier 46, the receiver winding 35, the back contact 54 of the push button 48, and the winding of relay CR to the negative side of the direct current source 36.

The embodiment as shown in Fig 4 differs from that as shown in Fig. 2 in that the relay CR in Fig. 2 is normally deenergized when the engine is at rest and the receiver is not affected by the moving inductor. Also, it differs in that the value of the current flowing through the winding of relay CR from the battery source without the influence of the inductor 28 is less than the release value of the relay CR. During operation of the engine when the bearing temperature is normal, the thermal contacts 32 and 33 are open, thereby placing the control winding 29 in an open circuited condition. The repeated movements of the inductor across the receiver with the control winding 29 open-circuited induces an alternating current in the receiver winding 35, which is rectified by the rectifier 46 so that it adds to the battery current and increases the current value in the relay pick up circuit when the reset button 48 is manually actuated following the starting of the engine operation. This resultant pulsating direct current will continue to flow in the previously mentioned stick energizing circuit for the relay CR including front contact 47 which maintains the relay in an energized condition during the normal operation of the engine.

When the bearing in Fig. 4 becomes overheated the thermal contacts 32 and 33 are closed which places the control winding in a shortcircuited condition. Under these conditions the voltage induced in the control winding 29 causes current to flow in the control winding 29 and the magnetic flux produced by this current opposes the magnetic flux which causes this current in control winding 29 to flow. As a result, the net change of flux is much less than when the control winding 29 is open-circuited. The resultant alternating current which is induced in the winding 35 and rectified to be applied to relay CR in addition to the battery current flowing in the energizing circuit in the relay CR is much smaller and does not increase the total current in the relay energizing circuit to a point where the relay CR will remain picked up. In fact, the net current value in relay CR under such circumstances falls below the drop away value and relay CR drops to close back contact 49 to actuate an alarm 78.

Figure 8:
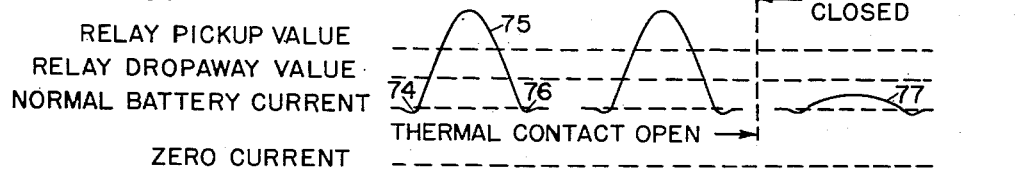
Fig. 8 illustrates the different current variations produced in the receiver by the circuit arrangement as shown in Fig. 4.

Fig. 8 graphically illustrates in a generally typical way the current variation in relay CR during repeated intervals of inductive coupling relationship. The solid line 75 in Fig. 8 represents the effect of the inductor with its control winding open-circuited on the current values of the energizing circuit. Commencing with the normal direct battery current at point 74, the induced voltage causes the current in relay CR to increase to a maximum value on the curve 75, and then as the inductor moves away from the receiver, the current falls back again to its normal value as designated at point 76 on the curve 75. The relay CR is made slow acting so that it will remain energized when the inductor is not in an inductively coupled relationship with the receiver.

When the control winding 29 is closed-circuited at thermal contacts 32 and 33, the current variation in the relay CR is represented by the curved line 77 of Fig 8. The current under this condition does not increase to a point where the relay CR can be picked up or be maintained stuck up when the inductor passes the receiver in an inductively coupled relationship.

Fig. 5 illustrates an alternative form of thermal contact apparatus including a fusible element. The bearing assembly 14 has a fusible element 79 suitably inserted in or attached to the bearing member 14 in close proximity to bearing surface 17. When the bearing becomes overheated, the fusible contact 81 melts thereby opening the circuit for the control winding 29. This form of thermal control can be used where the thermal contacts are closed under normal bearing temperature conditions such as shown in Figs. 2 and 3.

In disclosing this invention, simplified and diagrammatic forms of illustration have been employed and no attempt has been made to show the exact construction preferably employed in practice. Obviously, various modifications may be made in the construction illustrated, and other parts and devices may be added to make a more complete system all without departing from this invention. It is understood, therefore, that the specific embodiments shown and described are merely illustrative of this invention and do not exhaust the underlying idea of means constituting this present invention.

What I claim is:

1. In combination with a rotatable machine element, a bearing member attached to said machine element and movable through a repetitive path, an inductor including a control winding and attached to said movable bearing member, means responsive to the temperature of said bearing member for governing the circuit condition of said control winding, a stationary receiver closely adjacent the repetitive path of said bearing carried inductor so as to be distinctively inductively influenced in accordance with the circuit condition of said control winding as determined by the temperature of said bearing member.

2. In combination with a connecting rod bearing of a reciprocating engine, an inductor including a control winding and attached to said connecting rod bearing, a means responsive to the temperature of said connecting rod bearing for determining the circuit condition of said control winding, a stationary inductive receiving apparatus so disposed as to be inductively influenced by the motion of said inductor, said stationary apparatus comprising an inductive receiver core including a receiver winding, circuit means including a source of current connected to said receiver winding for magnetically energizing said inductive receiver core, and circuit means responsive to the current variation in said receiver winding for giving an indication of the temperature condition of said connecting rod bearing when said engine is in operation.

3. An apparatus for detecting the overheated condition of a moving connecting rod bearing in a reciprocating engine in which the controlling influences are transferred from the moving connecting rod bearing to stationary receiving apparatus through the inductive cooperation of a bearing carried inductor and a stationary receiver comprising, a bearing carried inductor provided with a control winding and circuit means responsive to the temperature of said connecting rod bearing for selectively open circuiting said winding, a stationary apparatus including a receiver located to be repeatedly influenced inductively by said bearing carried inductor during engine operation, a winding on said receiver constantly energized by direct current which is slightly varied when said inductor and receiver pass through said inductive coupling relationship and said control winding is closed circuited but which is substantially varied when said control winding is open circuited, circuit means associated with said receiver winding including an electroresponsive means giving one indication when the current in said receiver winding is slightly varied and giving a different indication when the current in said receiver winding is substantially varied, to thereby give an indication in accordance with the selective operation of said temperature responsive means.

4. An apparatus for detecting the overheated condition of a moving connecting rod bearing in a reciprocating engine in which the thermal condition of said connecting rod bearing is transferred from the moving connecting rod bearing to a stationary receiving apparatus through the inductive co-operation of a bearing carried inductor and a stationary receiver, said bearing carried inductor provided with a control winding and circuit means responsive to the temperature of said connecting rod bearing for selectively open circuiting said winding, stationary apparatus including said receiver being adapted to be influenced inductively by said inductor during engine operation, said receiver having a magnetized core structure and a winding about said core structure, a receiver circuit including said receiver winding and an electromagnetic relay, and a source of current for energizing said circuit, said energization of said receiver circuit being effective to cause said relay to be normally picked up, the current in said electromagnetic relay when said inductor and receiver pass through said inductive coupling relationship being distinctly varied, said current being reduced to cause said relay to drop away only when said control winding is open circuited, and circuit means responsive to the deenergization of said relay for indicating the excessive temperature of said connecting rod bearing.

5. An apparatus for detecting the overheated condition of a moving connecting rod bearing in a reciprocating engine in which the controlling influences are transferred from the moving connecting rod bearing to a stationary receiving apparatus through the inductive co-operation of a bearing carried inductor and a stationary receiver, said bearing carried inductor provided with a control winding and circuit means responsive to the temperature of said connecting rod bearing for selectively open-circuiting said winding, stationary apparatus including said receiver being adapted to be influenced inductively by said inductor during engine operation, said receiver having a magnetizable core structure and a winding about said core structure, a receiver circuit including in series connection said receiver winding and an electromagnetic relay and a source of current for energizing said circuit, said energization of said receiver circuit being effective to cause said relay to be normally picked up, the current in said receiver when said inductor and receiver pass through said inductive coupling relationship being distinctly varied, said current being substantially reduced to cause said relay to drop away only when said control winding is open circuited, and circuit means responsive to the energization of said relay for controlling an indication circuit.

6. An apparatus for detecting the overheated condition of a moving connecting rod bearing in a reciprocating engine in which the controlling influences are transferred from the moving connecting rod bearing to a stationary receiving apparatus through the inductive co-operation of a bearing carried inductor and a stationary receiver, said bearing carried inductor provided with a control winding and circuit means responsive to the temperature of said connecting rod bearing for selectively open circuiting said winding, stationary apparatus including said receiver being adapted to be repeatedly influenced inductively by said inductor during engine operation, said receiver having a magnetizable core structure and a primary winding about said core structure, a circuit means for energizing said primary winding with direct current to magnetize said core structure, a secondary receiver circuit including a secondary receiver winding about said core structure and an electroresponsive device and a unidirectional current controlling device in series, the energizing of said primary winding being effective to inductively couple said primary and secondary winding, the repeated passing of said inductor across the receiver in inductive coupling relationship being effective to rectify said alternating current in said secondary winding, and said repeated pulses of rectified alternating current being of sufficient amplitude to energize said electroresponsive device only when said control winding on said moving inductor is in an open circuit condition.

7. A system for detecting the overheated condition of a moving connecting rod bearing in a reciprocating engine in which the controlling influences are transferred from said moving connecting rod bearing to a stationary receiving apparatus through the inductive co-operation of a bearing carried inductor in a stationary receiver, said bearing carried inductor provided with a control winding and circuit means responsive to the temperature of said connecting rod bearing for effectively close circuiting said control winding when the temperature of said bearing rises above a particular point, stationary apparatus including said receiver being adapted to be influenced inductively by said inductor during engine operation, said receiver having a magnetizable core structure and a winding about said core structure, a receiver circuit including in series connection said receiver winding and an electromagnetic relay and a current rectifying device and having a source of current for energizing said receiver circuit, said energization of said receiver circuit being ineffective to cause said relay to be normally picked up, a rectified alternating current being induced in said receiver circuit when said inductor and receiver repeatedly pass through said inductive coupling relationship and being effective to increase the amplitude of said current in said electromagnetic relay to cause said relay to become effectively energized only when said control winding is open circuited, and circuit means controlled by the energization of said relay for controlling an indication device for indicating the excessive temperature of said connecting rod bearing above said particular point.

8. In an organization for detecting overheated moving connecting rod bearings in a reciprocating engine, a bearing-carried inductor having a control winding and mounted on a connecting rod bearing, a thermal responsive contact associated with said inductor and mounted on said connecting rod bearing to be responsive to its temperature, said thermal responsive contact being capable of opening and closing a circuit including said control winding, a stationary receiver located adjacent the circular path of said bearing-carried inductor to be repeatedly inductively influenced thereby while the engine is in operation, said receiver including a core having a normal magnetic flux and having an output winding on such core, whereby the passage of said bearing-carried inductor when its control winding is close circuited has little effect on the change in the magnetic flux in said receiver core but when said control winding is open circuited is effective to cause a substantial change in magnetic flux in said receiver core during each passage of the bearing-carried inductor, and electroresponsive circuit means connected to said receiver winding and distinctively controlled when there is a substantial change in flux in said receiver core.

9. In an organization for detecting over-heated moving connecting rod bearings in a reciprocating engine, a bearing-carried inductor having a control winding and mounted on a connecting rod bearing, a thermal responsive contact associated with said inductor and mounted on said connecting rod bearing to be responsive to its temperature, said thermal responsive contact being normally open but being closed to complete a circuit for said control winding when the temperature of said bearing rises above a preselected point, a stationary receiver core located adjacent the circular path of said bearing-carried inductor to be repeatedly inductively influenced thereby while the engine is in operation, said receiver core having a normal magnetic flux and having an output winding on such core, and electroresponsive circuit means connected to said output winding and distinctively controlled by energy induced in said winding only while said engine is operating and said thermal responsive contact is open.

10. In an organization for detecting over-heated moving connecting rod bearings in a reciprocating engine, a bearing-carried inductor having a control winding and mounted on a connecting rod bearing, a thermal responsive contact associated with said inductor and mounted on said connecting rod bearing to be responsive to its temperature, said thermal responsive contact being normally open but being closed to shunt said control winding when the temperature of said bearing rises above a preselected point, a stationary receiver located adjacent the circular path of said bearing-carried inductor to be repeatedly inductively influenced thereby while the engine is in operation, said stationary receiver including a core having a winding mounted thereon, circuit means including a source of energy, a rectifier unit, and a slow releasing electroresponsive device, connected in series with said control winding on said stationary receiver, whereby said stationary receiver core has a normal magnetic flux which is substantially varied upon each passage of said bearing-carried inductor except when said thermal responsive contact is closed due to an abnormal heat condition in said bearing thereby maintaining said electro-responsive device normally actuated by repeated pulses of energy but allowing such device to become inactive upon the occurrence of an abnormal temperature in said bearing and the failure of said device to receive said repeated pulses of energy.

References Cited in the file of this patent

UNITED STATES PATENTS

| | | |
|---|---|---|
| 1,504,075 | Paul | Aug. 5, 1924 |
| 2,552,165 | Fritzinger | May 9, 1951 |